United States Patent [19]

Katayama

[11] Patent Number: 5,153,749
[45] Date of Patent: Oct. 6, 1992

[54] IMAGE ENCODING APPARATUS

[75] Inventor: Akihiro Katayama, Kawasaki, Japan

[73] Assignee: Canon Kabushiki Kaisha, Tokyo, Japan

[21] Appl. No.: 724,465

[22] Filed: Jun. 27, 1991

Related U.S. Application Data

[63] Continuation of Ser. No. 401,240, Aug. 31, 1989, abandoned.

[30] Foreign Application Priority Data

Sep. 1, 1988 [JP] Japan .............................. 63-220045

[51] Int. Cl.⁵ .............................................. H04N 1/40
[52] U.S. Cl. ..................................... 358/448; 358/445; 358/447
[58] Field of Search ...................... 358/448, 443, 261.3, 358/426, 445, 447, 456, 459, 462, 463, 466, 400, 261.1, 261.2, 429, 432, 133, 138; 382/50, 54, 56

[56] References Cited

U.S. PATENT DOCUMENTS

| 4,414,580 | 11/1983 | Johnsen et al. | 358/261.3 |
| 4,654,721 | 3/1987 | Goertzel et al. | 358/459 |
| 4,656,525 | 4/1987 | Norris | 358/447 |
| 4,668,995 | 5/1987 | Chen et al. | 358/459 |
| 4,682,869 | 7/1987 | Itoh et al. | 358/426 |
| 4,710,823 | 12/1987 | Kitazawa | 358/456 |
| 4,766,499 | 8/1988 | Inuzuka | 358/261.2 |
| 4,782,399 | 11/1988 | Sato | 358/447 |

Primary Examiner—Edward L. Coles, Sr.
Assistant Examiner—Thomas D. Lee
Attorney, Agent, or Firm—Fitzpatrick, Cella, Harper & Scinto

[57] ABSTRACT

An image encoding apparatus includes a conversion circuit for converting binary image data to be encoded into multi-value image data, a sampling circuit for sub-sampling the multi-value image data from the conversion circuit, a binary-encoding circuit for binary-encoding the multi-value image data sub-sampled by the sampling circuit, and an encoding circuit for encoding binary image data from the binary-encoding circuit. The binary-encoding circuit binary-encodes the multi-value image data while diffusing an error generated upon binary-encoding to surrounding pixels.

22 Claims, 3 Drawing Sheets

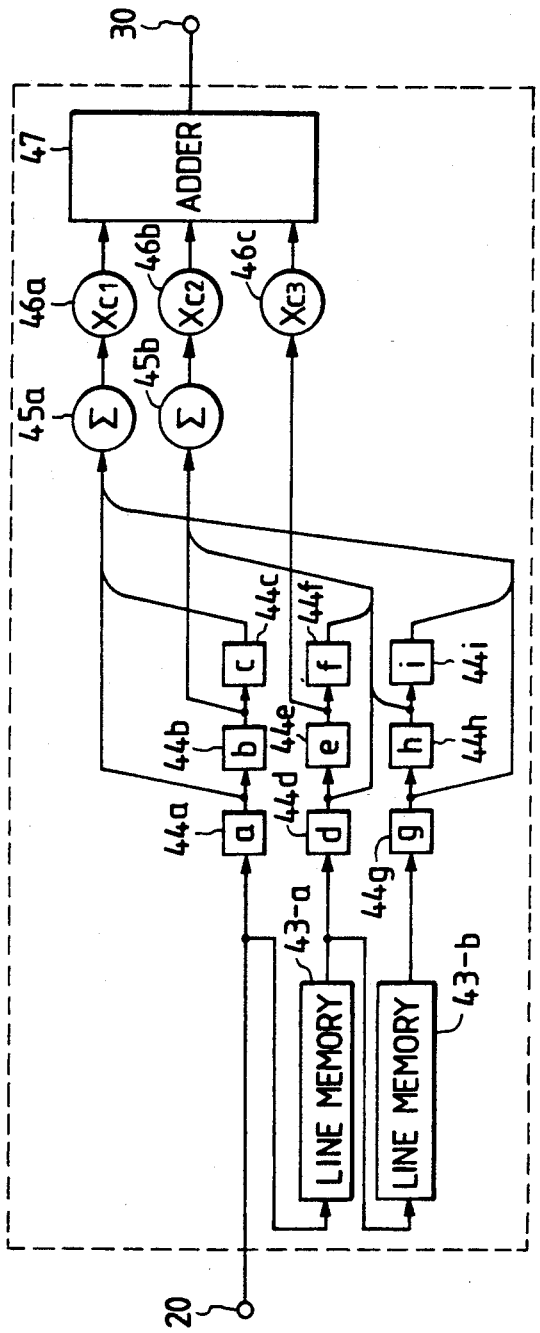
FIG. 2
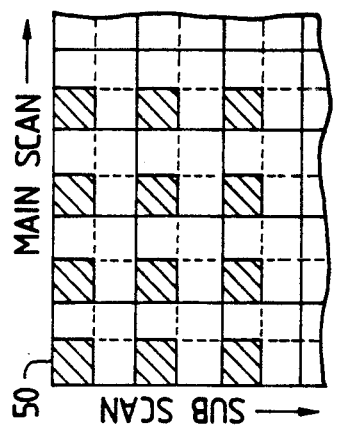
FIG. 4
FIG. 3

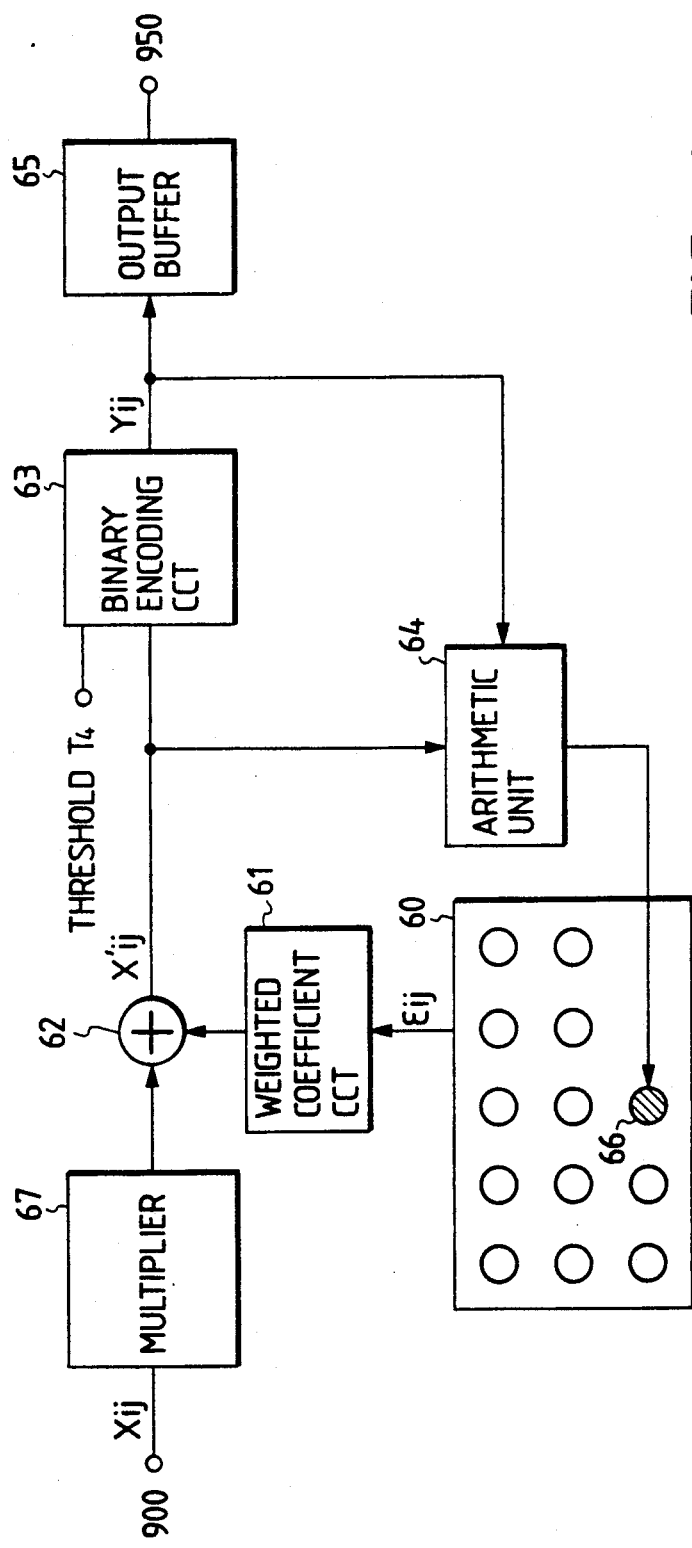

IMAGE ENCODING APPARATUS

This application is a continuation of application Ser. No. 07/401,240 filed Aug. 31, 1989, now abandoned.

BACKGROUND OF THE INVENTION

1. Field of the Invention

The present invention relates to an image encoding apparatus for progressively encoding binary image.

2. Related Background Art

In a facsimile apparatus as a typical still image communication apparatus, a method of encoding an image in accordance with MH or MR coding by sequentially scanning the image is employed. In this method, in order to recognize the entire image, all the image data must be transmitted, resulting in a long transmission time. Therefore, it is difficult to apply this method to an image communication service such as an image data base service, a videotex, or the like, in which an image must be quickly judged.

Unlike the method employed in the facsimile apparatus, a sequential reproducing/encoding method, e.g., progressive coding, is proposed in which rough image data is transmitted before the entire image is transmitted, and additional data is then transmitted to generate detailed image data.

In order to progressively encode binary image data, an image is sub-sampled to generate images having different resolutions, and the images are encoded from those having lower resolutions.

However, if image data is merely sub-sampled to form a low-resolution image, characters or fine lines may be disconnected or omitted before encoding. Therefore, encoded data obtained by encoding the low-resolution image does not properly express an original image. Therefore, an image obtained by decoding such encoded data cannot accurately reproduce the original image.

SUMMARY OF THE INVENTION:

The present invention has been made in consideration of the above situation, and has as its object to provide an image encoding apparatus for encoding an image so that an original image can be satisfactorily reproduced.

It is another object of the present invention to provide an image encoding apparatus which can form and encode a low-resolution image without omitting characters or fine lines in an original image.

It is still another object of the present invention to provide an image encoding apparatus which can satisfactorily encode images in respective stages upon progressive coding.

The above and other objects and features of the present invention will be apparent from the following description.

BRIEF DESCRIPTION OF THE DRAWINGS

FIG. 2 is a block diagram of a reverse quantizing circuit;

FIG. 3 is a table showing filter coefficients of the reverse quantizing circuit;

FIG. 4 is a view showing positions of pixels to be sampled by a sampling circuit;

FIG. 5 is a block diagram of a binary encoding circuit; and

FIG. 6 is a table showing weighted coefficients.

DETAILED DESCRIPTION OF THE PREFERRED EMBODIMENT

Figure 1:
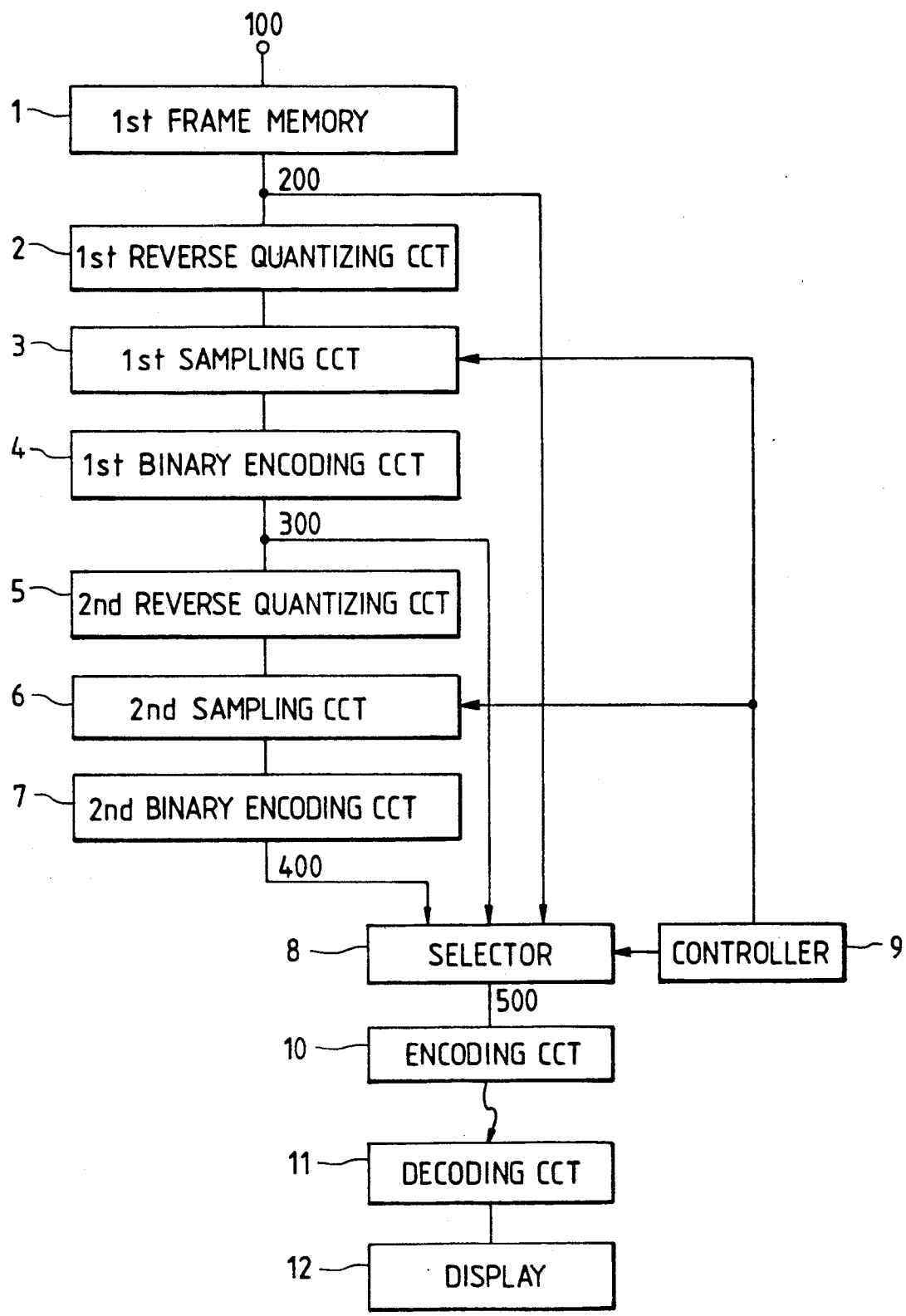
FIG. 1 is a block diagram showing an embodiment of an encoder to which the present invention is applied.

FIG. 1 is a block diagram of an encoder to which the present invention is applied.

Binary data 100 representing an original image is stored in a first frame memory 1. Binary data 200 read out from the first frame memory 1 is subjected to low-pass filtering processing (3×3 filter) in a first reverse quantizing circuit 2, and is converted to multi-value data. The multi-value data is sub-sampled to a desired resolution (in this case, ½ that of an original image) by a first sampling circuit 3. The sub-sampled multi-value data is binary-encoded by an error diffusion method by a first binary encoding circuit 4.

Binary data 300 is input to a second reverse quantizing circuit 5 and a selector 8. The data 300 is subjected to low-pass filtering processing (3×3 filter) by the second reverse quantizing circuit 5 again to be converted to multi-value data. The multi-value data is sub-sampled to a ½ resolution (¼ that of the original image) by a second sampling circuit 6. The multi-value data is binary-encoded by the error diffusion method by a second binary encoding circuit 7.

The selector 8 selects one of the signal 200 from the first frame memory, the signal 300 from the first binary encoding circuit, and a signal 400 from the second binary encoding circuit in accordance with data from a controller 9, and outputs the selected signal as a signal 500.

The signal 500 is subjected to MH coding by an encoding circuit 10, and is transmitted.

At a reception side, a decoding circuit 11 decodes the MH-encoded data, and a display 12 displays the decoded data.

FIG. 2 is a block diagram of the first reverse quantizing circuit 2. An input binary signal 20 is latched by latches 44a, 44b, and 44c to be delayed by one pixel clock, respectively. Line memories 43-a and 43-b hold input signals delayed by one line. Signals having pixel positions corresponding to those of the latches 44a, 44b, and 44c are obtained at latches 44d, 44e, and 44f, and latches 44g, 44h, and 44i. Thus, binary data corresponding to nine pixels constituting a 3×3 matrix shown in FIG. 3 can be obtained. The output signals from the latches 44a, 44c, 44g, and 44i are added by an adder 45a, and the sum is multiplied with a constant (×C$_1$) by a multiplier 46a.

The output signals from the latches 44b, 44d, 44f, and 44h are added by an adder 45b, and the sum is multiplied with a constant (×C$_2$) by a multiplier 46b. The output signal from the latch 44e as a central value is multiplied with a constant (×C$_3$) by a multiplier 46c. The values of the constants C$_1$, C$_2$, and C$_3$ indicate degrees of reverse quantization, and can be independently set by the external controller 9. In this case, standard values are set to be C$_1$=C$_2$=C$_3$=1.

The output signals from the multipliers 46a, 46b, and 46c are added by an adder 47, and the sum is output as a multi-value signal 30. Note that the second reverse quantizing circuit 5 can be realized by the same arrangement as in FIG. 2.

FIG. 4 is a view for explaining the operation of the sampling circuits 3 and 6 used in the encoder shown in FIG. 1. Hatched pixel data in FIG. 4 are sampled at every other timings in main and sub scan directions, so that a sub-sampled image having a ½ size (¼ in terms of an area) can be formed. This can be easily realized by adjusting latch timings of image data.

In this manner, binary data is converted to multi-value data in consideration of surrounding pixel data using the reverse quantizing circuit shown in FIG. 2 before the sub-sampling operation for decreasing a resolution. Sampling processing can be performed without ignoring image data which do not correspond to pixel positions but sub-sampling them in consideration of these image data, so that resolution conversion can be attained without losing original image data.

FIG. 5 is a block diagram of the first binary encoding circuit 4 using the error diffusion method of this embodiment. Multi-value image data $X_{ij}$ is input from the first sampling circuit 3 to a terminal 900. A multiplier 67 multiplies input data with $(255/(4C_1+4C_2+C_3))$ to normalize the input data to a value between 0 (inclusive) and 255 (inclusive). An error buffer memory 60 stores density errors $\epsilon_{ij}$ diffused up to a given timing in units of pixels. A group of errors $\epsilon_{ij}$ to be used in the error buffer memory 60 follows the multi-value data $X_{ij}$ that a corresponding window 66 is moved as the multi-value data $X_{ij}$ advances. A weighted coefficient circuit 61 multiplies an effective error $a_{ij}$ with a predetermined weighted coefficient $a_{kl}$ in the error buffer memory 60 to form a normalized correction value.

FIG. 6 shows an array of the weighted coefficients $a_{kl}$. Assuming that a pixel position of the multi-value image data $X_{ij}$ in the error buffer memory 60 is 66, this position also corresponds to a position indicated by "*" of the weighted coefficients $a_{kl}$.

An adder 62 adds the normalized correction value to the input multi-value image data $X_{ij}$ to form corrected data $X'_{ij}$. The above processing is expressed by the following equation.

$$X_{ij}' = X_{ij} + \frac{\sum_{kl} a_{kl} \cdot a_{i+k\,j+l}}{\Sigma a_{kl}}$$

In this equation, the second term in the right-hand side indicates the normalized correction value.

The corrected data $X'_{ij}$ is compared with a threshold value $T_4$ (e.g., 128 gradation level) by a binary encoding circuit 63. If $X'_{ij} \geq T_4$, the binary encoding circuit 63 outputs logic level "1" (corresponding to 255 gradation level) as output data $Y_{ij}$, otherwise, it outputs logic level "0" (corresponding to 0 gradation level) as the output data $Y_{ij}$ In this manner, the multi-value corrected data $X'_{ij}$ is binary-encoded. The binary data $Y_{ij}$ is stored in an output buffer 65.

An arithmetic unit 64 subtracts the corrected data $X'_{ij}$ from the output data $Y_{ij}$ (0=0 gradation level or 1=255 gradation level) and stores a new density error $\epsilon_{ij}$ generated upon printing of the corresponding pixel at the pixel position 66 of the error buffer memory 60. This operation is sequentially repeated by advancing the input multi-value image data $X_{ij}$ pixel by pixel, thus executing binary encoding processing of the error diffusion method. In this case, error data of 12 surrounding pixels are used. However, the present invention is not limited to this, and error data of four surrounding pixels may be used. If the coefficients in the weighted coefficient circuit are set to be powers of the number of pixels, the weighted coefficient circuit can be constituted by a shift arithmetic operation. The second binary encoding circuit 7 can be realized by the same arrangement as in FIG. 5.

In this manner, multi-value image data whose resolution is decreased upon sampling at the sampling circuit 3 or 6 is not merely binary-encoded but is binary-encoded by the error diffusion method.

Thus, an error generated upon binary-encoding of multi-value data is diffused to surrounding pixels, and multi-value data is binary-encoded while preserving an image density. Omission of data caused by binary-encoding processing can be minimized. Therefore, characters, fine lines, and the like can be satisfactorily binary-encoded, and can be prevented from being disconnected or omitted.

The selector 8 outputs one of the signals 200, 300, and 400 as the signal 500 under the control of the controller 9. For example, the selector 8 selects the signal 400 in the first stage, and sends it to an encoding circuit 10. Thus, an image having a resolution ¼ that of an original image can be encoded. After the ¼-resolution image is transmitted, the control advances to the next stage.

In the next stage, the signal 300 is selected, and an image having a resolution ½ that of an original image is encoded and transmitted. Thereafter, the signal 200 is selected, and the original image is encoded and transmitted.

With the above method, an image can be progressively encoded and transmitted.

In this embodiment, the encoding circuit 10 and a decoding circuit 11 comprise a known MH encoder and decoder, and a detailed description thereof is omitted. The encoder and the decoder are not limited to the MH encoder and decoder but may be MR, MMR, arithmetic coding encoder and decoder, and the like.

For a color image, the circuit of this embodiment is prepared in correspondence with predetermined colors, thus obtaining a progressive encoding apparatus for a color binary image which is free from degradation in characters and fine lines.

In this embodiment, the number of stages is 3. However, the present invention is not limited to this, and required numbers of the reverse quantizing circuits, sampling circuits, and binary encoding circuits can be prepared to provide an N-stage encoding apparatus.

The above-mentioned processing including this embodiment can be easily realized by software processing using a microprocessor.

As described above, multi-value data obtained by reverse-quantizing binary image data is sub-sampled, and sub-sampled multi-value data is subjected to binary-encoding processing by the error diffusion method to preserve an image density of an original image. Therefore, good progressive data (encoded data) free from omission of characters and fine lines can be obtained.

The preferred embodiment of the present invention has been described. However, the present invention is not limited to this, and various changes and modifications may be made within the spirit and scope of the appended claims.

What is claimed is:

1. An image encoding apparatus comprising:
   providing means for providing original binary image data to be encoded, the binary image data having a predetermined resolution;
   forming means for sequentially forming a plurality of first binary image data, having a first resolution, and second binary image data, having a second resolution, the first and second resolutions each being less than the resolution of the original binary image data; and encoding means for encoding binary image data formed by said forming means, wherein said forming means comprises:

conversion means for converting binary image data into multi-value image data by processing binary image data of surrounding pixels, sampling means for sub-sampling the multi-value image data from said conversion means, and binary encoding means for binary-encoding the multi-value image data sub-sampled by said sampling means, wherein said binary-encoding means binary-encodes the multi-value image data while diffusing an error generated upon binary-encoding the surrounding pixels.

2. An apparatus according claim 1, wherein said conversion means converts binary image data of a pixel of interest to multi-value data by filtering binary image data of surrounding pixels.

3. An apparatus according to claim 1, wherein said binary-encoding means corrects the multi-value image data to be binary-encoded in accordance with errors of surrounding pixels.

4. An apparatus according to claim 1, wherein said encoding means further encodes the original binary image data from said providing means.

5. An apparatus according to claim 1, wherein said encoding means encodes sequentially the plurality of binary image data in the order of lower resolution.

6. An apparatus according to claim 1, wherein said providing means has memory means for storing the original binary image data.

7. An image encoding apparatus comprising:

first conversion means for converting binary image data to be encoded into multi-value image data;

first sampling means for sub-sampling the multi-value image data from said first conversion means to form multi-value image data having a first resolution;

first binary-encoding means for binary-encoding the multi-value image data having the first resolution from said first sampling means;

second conversion means for converting binary image data from said first binary-encoding means into multi-value image data;

second sampling means for sub-sampling the multi-value image data from said second conversion means to form multi-value image data having a second resolution;

second binary-encoding means for binary-encoding the multi-value image data having the second resolution from said second sampling means; and encoding means for encoding binary image data having the first and second resolutions from said first and second binary-encoding means, wherein said first and second binary encoding means binary-encode multi-value image data while diffusing an error generated upon binary-encoding to surrounding pixels.

8. An apparatus according to claim 7, wherein said first and second conversion means convert binary image data of a pixel of interest to multi-value image data using binary image data of surrounding pixels.

9. An apparatus according to claim 7, wherein said first and second binary-encoding means correct the multi-value image data to be binary-encoded in accordance with errors of surrounding pixels.

10. An apparatus according to claim 7, further comprising selection means for selecting the binary image data from one of said first and second binary-encoding means.

11. An apparatus according to claim 7, wherein said encoding means first encodes binary image data having the second resolution, and then said encoding means encodes binary image data having the first resolution.

12. An image encoding method comprising:

a first conversion step for converting binary image data to be encoded into multi-value image data;

a first sampling step for sub-sampling the multi-value image data obtained by said first conversion step to form multi-value image data having a first resolution;

a first binary-encoding step for binary-encoding the multi-value image data having the first resolution obtained by said first sampling step;

a second conversion step for converting binary image data obtained by said first binary-encoding step into multi-value image data;

a second sampling step for sub-sampling the multi-value image data obtained by said second conversion step to form multi-value image data having a second resolution;

a second binary-encoding step for binary-encoding the multi-value image data having the second resolution obtained by said second sampling step; and an encoding step for encoding binary image data having the first and second resolutions obtained by said first and second binary-encoding steps, wherein, in said first and second binary encoding steps, multi-value image data is binary-encoded while diffusing an error generated upon binary-encoding to surrounding pixels.

13. A method according to claim 12, wherein, in said first and second conversion steps, binary image data of a pixel of interest is converted to multi-value image data using binary image data of surrounding pixels.

14. A method according to claim 12, wherein, in said first and second binary-encoding steps, the multi-value image data to be binary-encoded is corrected in accordance with errors of surrounding pixels.

15. A method according to claim 12, further comprising a selection step for selecting the binary image data obtained by one of said first and second binary-encoding steps.

16. A method according to claim 12, wherein, in said encoding step, first binary image data having the second resolution is encoded, and then binary image data having the first resolution is encoded.

17. An image encoding method comprising:

a providing step for providing original binary image data to be encoded, the binary image data having a predetermined resolution;

a forming step for sequentially forming a plurality of first binary image data, having a first resolution, and second binary image data, having a second resolution, the first and second resolutions each being less than the resolution of the original binary image data; and an encoding step for encoding binary image data obtained by said forming step, wherein said forming step comprises:

a conversion step for converting binary image data into multi-value image data by processing binary image data of surrounding pixels, a sampling step for sub-sampling the multi-value image data obtained by said conversion step, and a binary-encoding step for binary-encoding the sub-sampled multi-value image data obtained by said sampling step, wherein, in said binary-encoding step, the multi-value image data is binary-encoded while diffusing an error generated upon binary-encoding the surrounding pixels.

18. A method according to claim 17, wherein in said conversion step, binary image data of a pixel of interest is converted to multi-value data by filtering binary image data of surrounding pixels.

19. A method according to claim 17, wherein, in said binary-encoding step, the multi-value image data to be binary-encoded is corrected in accordance with errors of surrounding pixels.

20. A method according to claim 17, wherein, in said encoding step, the original binary image data is encoded.

21. A method according to claim 17, wherein in said encoding step, the plurality of binary image data is sequentially encoded in the order of lower resolution.

22. A method according to claim 17, further comprising a memory step for storing the original binary image data.

* * * * *

UNITED STATES PATENT AND TRADEMARK OFFICE
CERTIFICATE OF CORRECTION

PATENT NO.  : 5,153,749
DATED       : October 6, 1992
INVENTOR(S) : AKIHIRO KATAYAMA It is certified that error appears in the above-identified patent and that said Letters Patent is hereby corrected as shown below:

<u>COLUMN 2</u>

Line 67, "timings" should read --timing-- and
             "sub scan" should read --sub-scan--.

<u>COLUMN 3</u>

Line 22, "that" should read --so that--.
    Line 50, "data $Y_{ij}$ In" should read --data $Y_{ij}$. In--.

<u>COLUMN 7</u>

Line 10, "wherein" should read --wherein,--.

<u>COLUMN 8</u>

Line 7, "wherein" should read --wherein,--.

Signed and Sealed this

Fourteenth Day of December, 1993

Attest:

BRUCE LEHMAN

Attesting Officer     Commissioner of Patents and Trademarks